US010907577B2

(12) United States Patent
Ghandour et al.

(10) Patent No.: US 10,907,577 B2
(45) Date of Patent: Feb. 2, 2021

(54) TRANSLATING LOCK FOR PIVOT DOOR THRUST REVERSER

(71) Applicant: ROHR, INC., Chula Vista, CA (US)

(72) Inventors: Imad D. Ghandour, San Diego, CA (US); Ken V. Huynh, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 129 days.

(21) Appl. No.: 16/029,387

(22) Filed: Jul. 6, 2018

(65) Prior Publication Data

US 2019/0120173 A1    Apr. 25, 2019

Related U.S. Application Data

(60) Provisional application No. 62/575,965, filed on Oct. 23, 2017.

(51) Int. Cl.
*F02K 1/00* (2006.01)
*F02K 1/76* (2006.01)
*F02K 1/60* (2006.01)
*F02K 1/70* (2006.01)

(52) U.S. Cl.
CPC ............... *F02K 1/766* (2013.01); *F02K 1/60* (2013.01); *F02K 1/70* (2013.01); *F05D 2220/32* (2013.01); *F05D 2260/52* (2013.01)

(58) Field of Classification Search
CPC . F02K 1/766; F02K 1/763; F02K 1/76; F02K 1/60; F02K 1/70; F02K 1/605; F02K 1/62; F02K 1/625; F02K 1/72; F05D 2220/32
See application file for complete search history.

(56) References Cited

U.S. PATENT DOCUMENTS

| RE24,703 | E | * | 9/1959 | Brame | B63H 11/12 |
| | | | | | 239/265.19 |
| 4,424,669 | A | * | 1/1984 | Fage | F02K 1/766 |
| | | | | | 244/110 B |
| 4,790,495 | A | * | 12/1988 | Greathouse | F02K 1/60 |
| | | | | | 239/265.29 |
| 5,344,197 | A | | 9/1994 | Rouzaud | |
| 5,775,639 | A | * | 7/1998 | Fage | F02K 1/60 |
| | | | | | 239/265.29 |
| 5,826,823 | A | | 10/1998 | Lymons et al. | |

(Continued)

FOREIGN PATENT DOCUMENTS

EP          3205867          8/2017

OTHER PUBLICATIONS

European Patent Office, European Search Report dated Jun. 28, 2019 in Application No. 18202158.4.

*Primary Examiner* — Todd E Manahan
*Assistant Examiner* — Edwin Kang
(74) *Attorney, Agent, or Firm* — Snell & Wilmer L.L.P.

(57) ABSTRACT

A lock mechanism for releasably securing a pivot door of a thrust reverser includes a frame, a blade housing connected to the frame, a blade member slidably disposed within the blade housing and configured to engage a lock fitting of the pivot door, an actuator configured to translate the blade member in a first direction with respect to the frame; a spring element configured to translate the blade member in a second direction with respect to the frame, and a loose-joint coupling configured to connect the actuator to the blade member.

7 Claims, 7 Drawing Sheets

(56) References Cited

U.S. PATENT DOCUMENTS

| | | | |
|---|---|---|---|
| 6,260,801 B1 * | 7/2001 | Peters | F02K 1/60 |
| | | | 239/265.29 |
| 6,487,845 B1 | 12/2002 | Modglin et al. | |
| 8,628,128 B2 | 1/2014 | Sternberger et al. | |
| 2010/0264676 A1 * | 10/2010 | Sternberger | B64C 13/00 |
| | | | 292/302 |
| 2014/0245716 A1 * | 9/2014 | Gonidec | F02K 1/70 |
| | | | 60/226.2 |
| 2017/0022935 A1 | 1/2017 | Corentin et al. | |

\* cited by examiner

TRANSLATING LOCK FOR PIVOT DOOR THRUST REVERSER

CROSS-REFERENCE TO RELATED APPLICATIONS

This application claims priority to, and the benefit of, U.S. Prov. Pat. Appl., Ser. No. 62/575,965, entitled "Pivot Door Thrust Reverser Door Locks," filed on Oct. 23, 2017, the entirety of which is incorporated herein for all purposes by this reference.

FIELD

The present disclosure relates generally to aircraft thrust reversers used with gas turbine engines and, more particularly, to locking mechanisms used with pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include thrust reversers capable of redirecting the bypass airflow from the rearward direction to, at least partially, a forward direction thus producing a rearward thrust that may serve to decelerate the forward motion of an aircraft and thereby assist braking the aircraft upon landing. Pivot door thrust reversers may be used with turbofan gas turbine engines for aircraft, including for corporate or business jets. A locking mechanism for a pivot door thrust reverser is disclosed herein.

SUMMARY

A lock mechanism for a pivot door of a thrust reverser is disclosed. In various embodiments, the lock mechanism includes a frame portion of the thrust reverser. The frame portion may define a first direction and a second direction with respect to the thrust reverser. The mechanism further includes a blade member slidably disposed with respect to the first direction and the second direction, with the blade member being configured to engage a lock fitting on the pivot door. An actuator is configured to translate the blade member in the first direction and a loose-joint coupling is configured to connect the actuator to the blade member.

In various embodiments, the loose-joint coupling comprises a first member connected to the blade member and configured to translate the blade member in the first direction in response to the actuator. The loose-joint coupling may also comprise a coupling member connected to the blade member and configured to translate the blade member in the first direction in response to the actuator. In various embodiments, the actuator includes a translating member configured to translate in the first direction and the second direction and an arm connecting the translating member to the blade member. The loose-joint coupling may be positioned between the arm and the blade member. In various embodiments, the lock mechanism further comprises a blade housing, where the blade member is configured to translate in the first direction and the second direction within the blade housing. The blade member may comprise a base portion and the blade housing may comprise a hollow portion configured for translational movement of the base portion within the blade housing. In various embodiments, a spring element may be configured to urge the blade member in the second direction. In various embodiments, the spring element is a coil spring having a first end configured to abut the blade housing and a second end configured to abut the blade member. In various embodiments, the spring element is a coil spring having a first end configured to abut a base of the actuator and a second end configured to abut a piston disposed within the actuator and connected to the translating member. The blade member may comprise a blade portion configured to engage the lock fitting on the pivot door. In various embodiments, the first direction is parallel to a central axis of the thrust reverser and the second direction is opposite the first direction. In various embodiments, the first direction is a fore direction with respect to the thrust reverser and the second direction is an aft direction with respect to the thrust reverser.

A lock mechanism for releasably securing a pivot door of a thrust reverser is disclosed. The lock mechanism includes a frame, a blade housing connected to the frame, a blade member slidably disposed within the blade housing and configured to engage a lock fitting on the pivot door, an actuator configured to translate the blade member in a first direction with respect to the frame, a spring element configured to translate the blade member in a second direction with respect to the frame, the second direction being opposite the first direction, and a loose-joint coupling configured to connect the actuator to the blade member.

In various embodiments, the actuator includes a translating member configured to translate in the first direction and the second direction and an arm connecting the translating member to the blade member. In various embodiments, the loose-joint coupling comprises a member connected to the arm and configured to translate the blade member in the first direction in response to the actuator. In various embodiments, the loose-joint coupling comprises a member connected to the blade member and configured to translate the blade member in the first direction in response to the actuator. In various embodiments, the blade member comprises a base portion and the blade housing comprises a hollow portion configured for translational movement of the base portion within the blade housing. In various embodiments, the lock mechanism further comprises a spring element configured to urge the blade member in the second direction, where the spring element is a coil spring having a first end configured to abut the blade housing and a second end configured to abut the blade member.

A pivot door thrust reverser having a lock mechanism for releasably securing an upper pivot door and a lower pivot door of the thrust reverser is disclosed. The thrust reverser includes a side beam, a first blade housing connected to the side beam, a first blade member slidably disposed within the first blade housing and configured to engage a lock fitting on the upper pivot door, a second blade housing connected to the side beam, a second blade member slidably disposed within the second blade housing and configured to engage a lock fitting on the lower pivot door, an actuator configured to translate the first blade member in a fore direction with respect to the thrust reverser and the second blade member in the fore direction, and a tee-handle connecting the actuator to the first blade member and to the second blade member, where the tee-handle is connected to the first blade member through a first loose-joint coupling and to the second blade member through a second loose-joint coupling.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to a direction outward or, generally, away from a reference component. As used herein, "proximal" or "proximate" refer to a direction inward or, generally, towards a reference component.

Figure 1:
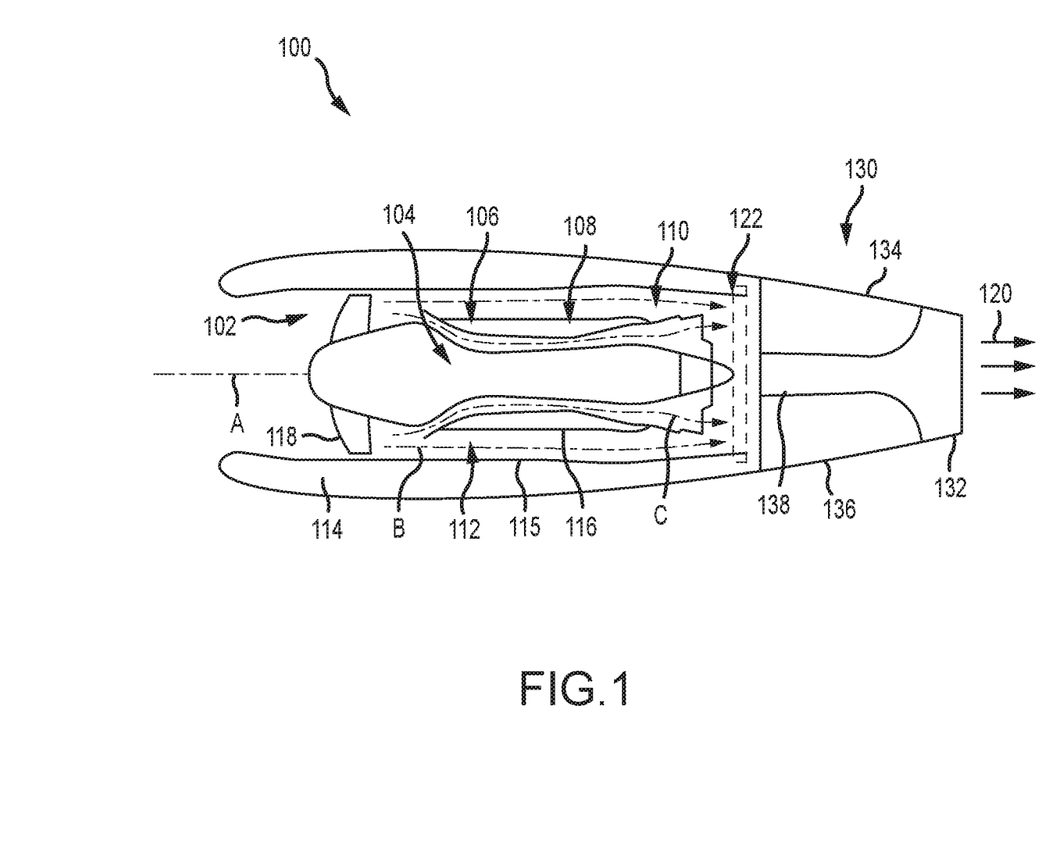
FIG. 1 is a schematic view of a gas turbine engine, in accordance with various embodiments.

Referring now to the drawings, FIG. 1 schematically illustrates a gas turbine engine 100 of the turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed, stowed or retracted position, as illustrated in FIG. 1. The thrust reverser 130 further includes an upper reverser door 134, a lower reverser door 136 and a pair of opposing side beams 138, which may house actuator componentry and connecting members used to open and close the upper reverser door 134 and lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 provides the reverse thrust used to decelerate an aircraft upon landing. Disclosed below is a locking mechanism used to secure upper and lower doors of a thrust reverser, according to various embodiments.

Figure 2A:
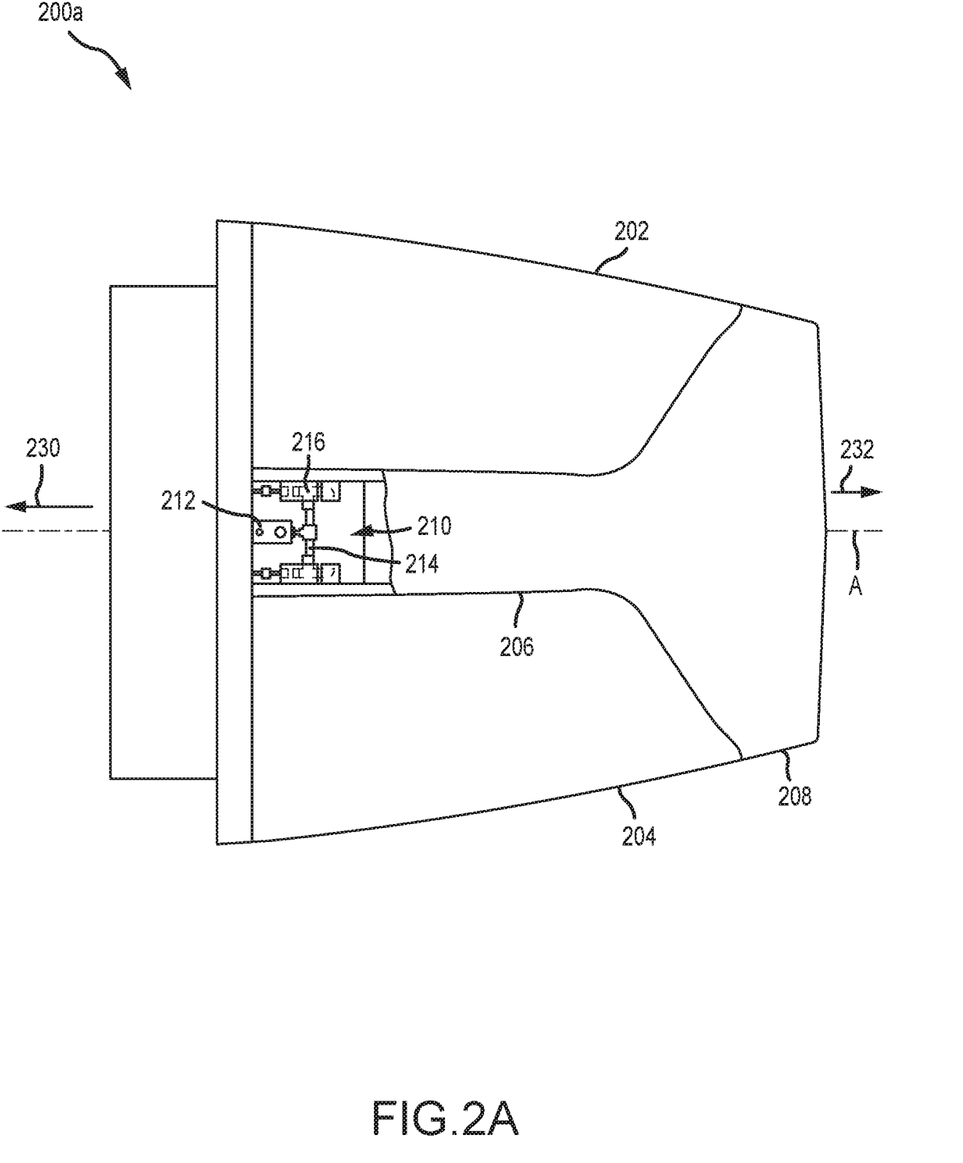
FIGS. 2A and 2B provide schematic views of a stowed thrust reverser for a gas turbine engine and a deployed thrust reverser for a gas turbine engine, respectively, according to various embodiments.
Figure 2B:
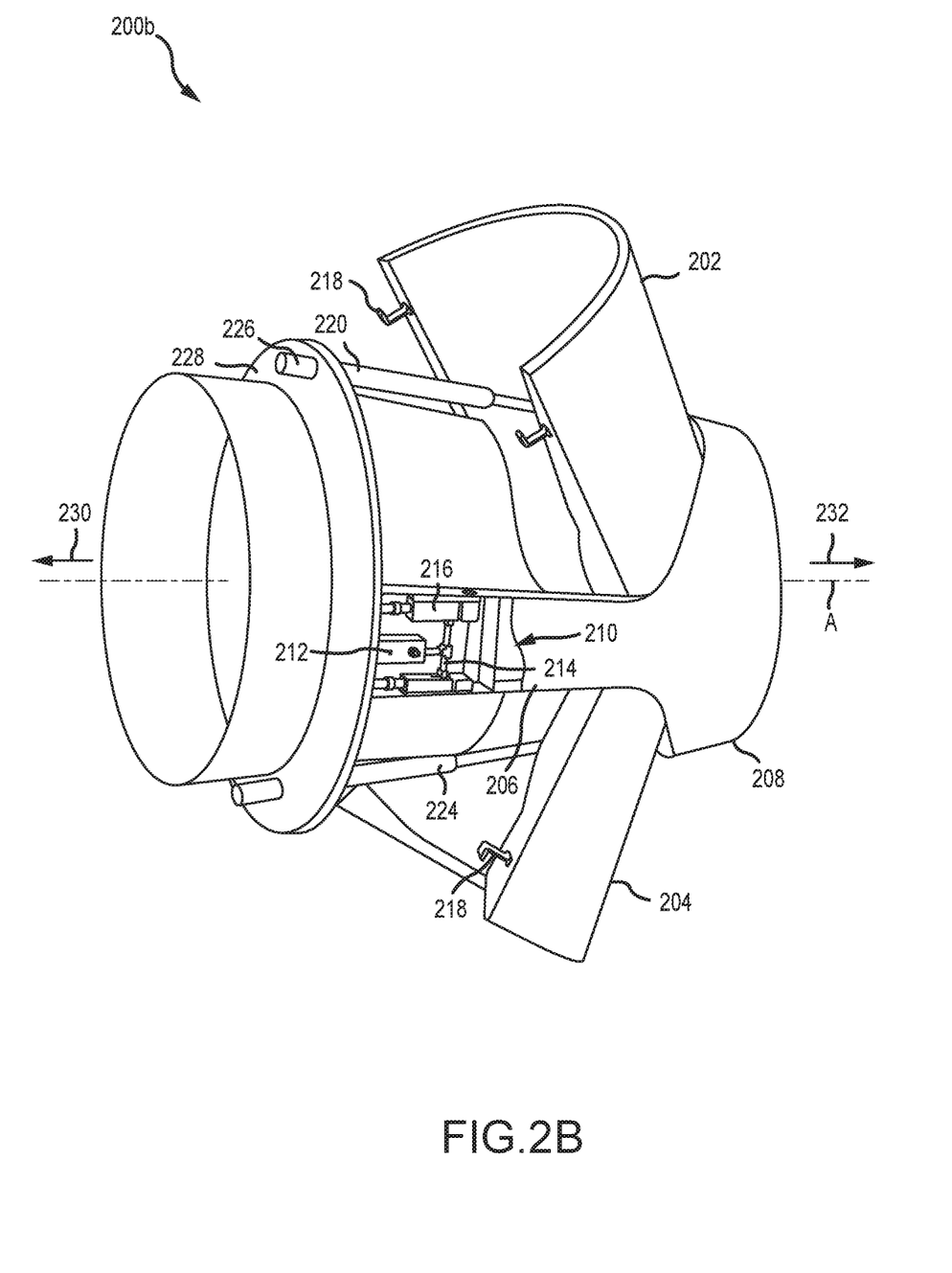

Referring now to FIGS. 2A and 2B, in accordance with various embodiments, a side view of a thrust reverser 200a is illustrated in a closed, stowed or retracted position and a perspective view of the thrust reverser 200b is illustrated in an open or a deployed position, respectively. The thrust reverser 200 (referring to both 200a and 200b) includes an upper reverser door 202, a lower reverser door 204, a pair of opposing side beams 206 (only one is shown) and an exhaust duct 208. The pair of opposing side beams 206 may provide a frame or structural support for operating the thrust reverser between deployed and retracted positions. In various embodiments, a lock mechanism 210 may be secured to one or both of the opposing side beams 206. As will be described in further detail below, the lock mechanism 210 may include an actuator 212 configured to selectively translate a tee-handle 214 in a fore direction 230 and an aft direction 232 with respect to a central axis A extending through the thrust reverser 200. The tee-handle 214 is coupled to a pair of blade assemblies 216 that are configured to slidably engage lock fittings 218 that extend from side portions of the upper reverser door 202 and the lower reverser door 204 toward the blade assemblies 216. In various embodiments, the blade assemblies 216 are urged in the aft direction 232 to engage the lock fittings 218 and in the fore direction 230 to disengage the lock fittings 218. An upper door actuator 220 is configured to open and close the upper reverser door 202 and a lower door actuator 224 is configured to open and close the lower reverser door 204. In various embodiments, the upper door actuator 220 has a first end 226 pivotally connected to an upper portion of a bulkhead 228 and an aft end (hidden) pivotally connected to an inner surface of the upper reverser door 202. The lower door actuator 224 may be similarly configured at the lower portion of the thrust reverser 200.

Figure 3:
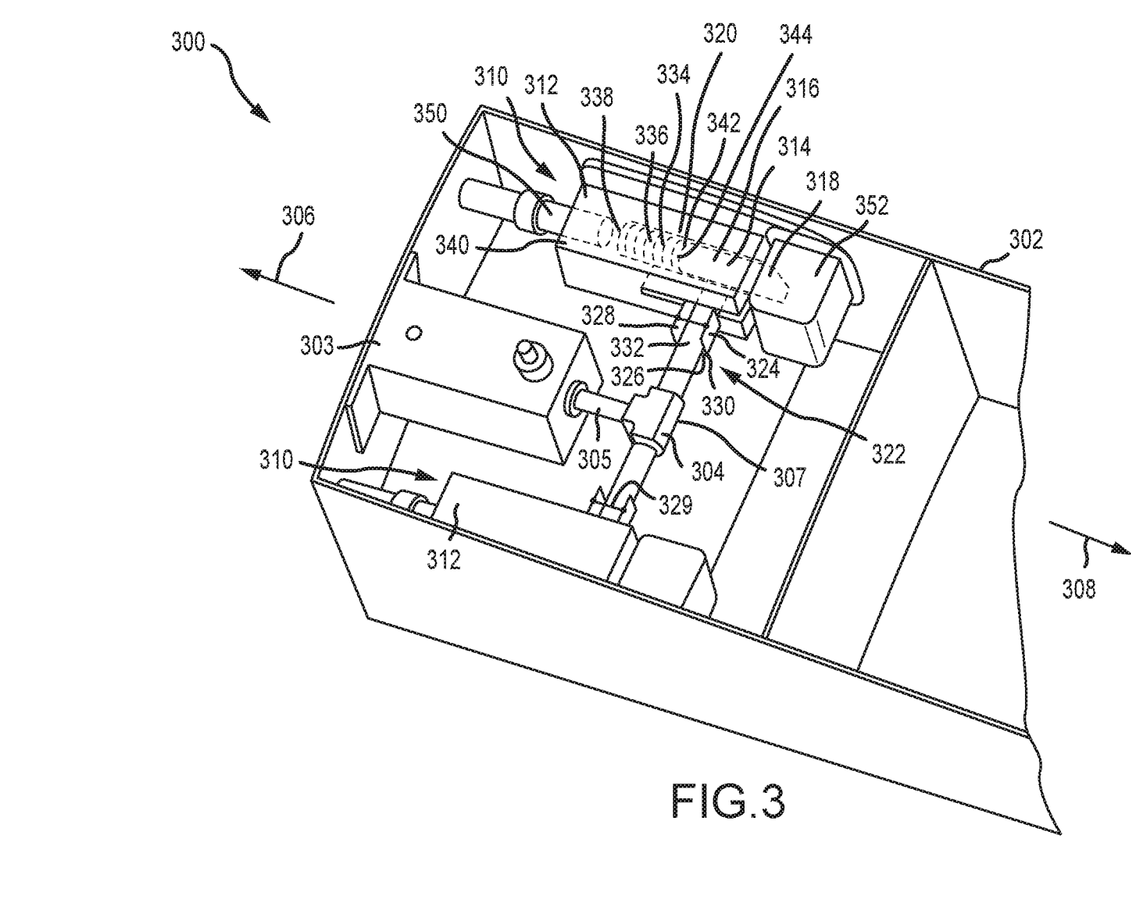
FIG. 3 is a perspective view of a thrust reverser door lock mechanism, according to various embodiments.

Referring now to FIG. 3, a perspective view of a lock mechanism 300 for a thrust reverser is illustrated, in accordance with various embodiments. The lock mechanism 300 is illustrated mounted to a frame 302. In various embodiments, the frame 302 is connected to or made an integral part of a side beam, such as one of the opposing side beams 206 referred to in FIG. 2. The lock mechanism 300 may include an actuator 303 configured to selectively translate a tee-handle 304 in a fore direction 306 and an aft direction 308. In various embodiments, the fore direction 306 and the aft direction 308 are parallel to a central axis, such as the central axis A referred to in FIG. 2. The tee-handle 304 may be coupled to a pair of blade assemblies 310 configured to slidably engage lock fittings extending from side portions of upper and lower reverser doors, such as, for example, the lock fittings 218 referred to in FIG. 2. In various embodiments, the blade assemblies 310 are urged in the aft direction 308 to engage the lock fittings and in the fore direction 306 to disengage the lock fittings. While the following disclosure employs the fore direction 306 and the aft direction 308 for purposes of description, it will be appreciated that the directions may be reversed by reversing the orientation of components with respect to the frame 302. Further, the disclosure may equally be read to employ terms such as first direction and second direction in describing the various embodiments disclosed herein, with the first and second directions including directions other than fore and aft.

In various embodiments, each blade assembly 310 includes a blade housing 312 and a blade member 314 slidably disposed within the blade housing 312 to translate in the fore direction 306 and the aft direction 308. In various embodiments, the blade member 314 includes a base portion 316 and a blade portion 318. The base portion 316 may be cylindrical in cross section and configured to slidably translate within a corresponding cylindrically shaped hollow portion 320 disposed within the blade housing 312. While various embodiments are described having a base portion 316 that is cylindrically shaped and a cylindrically shaped hollow portion 320, other shapes are contemplated, such as triangular, square, polygonal and elliptical shapes, etc.

In various embodiments, each blade member 314 is coupled to the tee-handle 304 using a loose-joint coupling 322. The loose-joint coupling 322 may include a coupling member 324 having a bottom portion 326, a first side portion 328 and a second side portion 330. The first side portion 328 and the second side portion 330 are spaced a distance sufficient to receive an arm 332 of the tee-handle 304 between the two portions. The bottom portion 326 may extend between the first side portion 328 and the second side portion 330. The coupling member 324 may be configured to loosely receive the arm 332 of the tee-handle 304 and may include a clip member 329 in order to retain the arm 322 within the coupling member 324. In various embodiments, the coupling member 324 or any component thereof, including one or more of the bottom portion 326, the first side portion 328 and the second side portion 330, may be connected to or made integral with the blade member 314. In various embodiments, the tee-handle 304 includes a translating member 305 configured to translate in and out of the actuator 303 along the fore direction 306 and the aft direction 308 and the arm 332 is connected to the translating member 305 via a tee-coupling 307.

In various embodiments, the loose-joint coupling 322 enables the actuator 303 to urge the blade member 314 in the fore direction 306 and in the aft direction 308 by translation of the tee-handle 304 in the fore direction 306 and in the aft direction 308, respectively. Conversely, an open end of the loose-joint coupling 322—e.g., the open end opposite the bottom portion 326 of the coupling member 324—decouples the blade member 314 from the tee-handle 304. In various embodiments, the loose-joint coupling 322 described above may be reversed, such that the coupling is disposed on or connected to the arm 332, rather than the blade member 314. Consistent with such reverse configuration, the blade member 314 would comprise a coupling arm extending from the blade member 314 toward the arm 332 of the tee-handle 304 and configured to engage the reverse loose-joint coupling structure connected to the arm 332. Translation of the blade member 314 via the actuator 303 and tee-handle 304 will be the same using either configuration. It will be appreciated that coupling members other than the three-sided members discussed above are contemplated, such as U-shaped or V-shaped members or members having one side or two sides, or any other member having the ability to engage the blade members or some component thereof while translating in one direction and disengage the blade members while translating in an opposite direction.

A spring element 334 may be employed to urge the blade member 314 in the aft direction 308 as the actuator 303 disengages from or otherwise allows the tee-handle 304 to freely translate in the aft direction 308. As described below with reference to FIGS. 4A and 4B, additional spring elements may be employed, either alone or in combination with the spring element 334. Such additional spring elements may, for example, be located in the actuator housing, as described below. When allowed to translate, the spring element 334 provides a load to translate the tee-handle 304 in the aft direction 308 via the load placed against the blade member 314. In various embodiments, the spring element 334 may comprise a passive element such as a coil spring 336 disposed within the cylindrically shaped hollow portion 320 of the blade housing 312. A first end 338 of the coil spring 336 may abut an end portion 340 of the blade housing 312, while a second end 342 of the coil spring 336 may about a fore end 344 of the base portion 316 of the blade member 314. In various embodiments, the spring element 334, or coil spring 336, may be configured to apply a continuous load on the blade member 314, urging the blade member 314 in the aft direction 308.

The above described configuration enables the blade member 314 to be urged in the fore direction 306 by operation of the actuator 303 translating the tee-handle 304 in the fore direction 306. The configuration also enables the blade member 314 to be urged in the aft direction 308 by the load applied to the blade member 314 by the spring element 334 or coil spring 336 upon release of the load in the fore direction 306 placed on the tee-handle 304 by the actuator 303. While various embodiments are described employing a passive element, such as the coil spring 336, as the spring element 334, other load producing systems, such as active hydraulic systems or electro-mechanical systems are contemplated as providing the load on the blade member 314 in the fore direction 306, either continuously or on demand. In various embodiments, the blade member 314, or the blade portion 318 of the blade member 314, is shaped or configured to be urged in the aft direction 308 in the case of a malfunction of an electronic or hydraulic system operating or controlling the lock mechanism 300. An angled surface of the blade portion 318, for example, facilitates translational movement of the blade portion 318 with respect to a lock fitting once the lock fitting assumes an overstow position or a near overstow position.

In various embodiments, a proximity sensor 350 is disposed proximate the blade member 314 to detect the position of the blade member 314—e.g., the translational position of the blade member 314 in both the fore direction 306 and the aft direction 308. The proximity sensor 350 may be configured to provide information to a controller whether the thrust reverser doors are locked to maintain a closed or stowed position or unlocked to maintain open or deployed position. The proximity sensor 350 may also be employed to provide information relating to partial or insufficient engagement of the blade member 314, such as occurs if the blade member 314 assumes a position insufficient to ensure the thrust reverser doors maintain a closed or stowed position. As described further below, when the thrust reverser doors are locked to maintain a closed or stowed position, the blade member 314 or, more particularly, the blade portion 318 of the blade member 314, is urged in the aft direction 308 to engage a lock fitting, such as one of the lock fittings 218 referred to in FIG. 2, thereby preventing the corresponding thrust reverser door from opening or deploying. Similarly, when the thrust reverser doors are unlocked to allow an open or deployed position to occur, the blade member 314 or, more particularly, the blade portion 318 of the blade member 314, is urged in the fore direction 306 to disengage the lock fitting, thereby allowing the corresponding thrust reverser door to open or deploy. In various embodiments, a cover 352 may be used to enclose the area where the blade portion 318 engages the lock fitting.

While the above description focuses on a single blade member 314 (e.g., a first or upper blade member) and its associated components and connections, the same description applies to a second or lower blade member and its associated components and connections, as illustrated in FIG. 3. Similarly, while the above description focuses on a single lock mechanism 300 (e.g., a first or port lock mechanism), the same description applies to a second or starboard lock mechanism. For example, while the lock mechanism 210 referred to in FIGS. 2A and 2B is illustrated as positioned on the port side beam, it will be appreciated that a second lock mechanism may be positioned on the starboard side beam in similar fashion using the same or similar componentry and principles of operation described above and below.

Figure 4A:
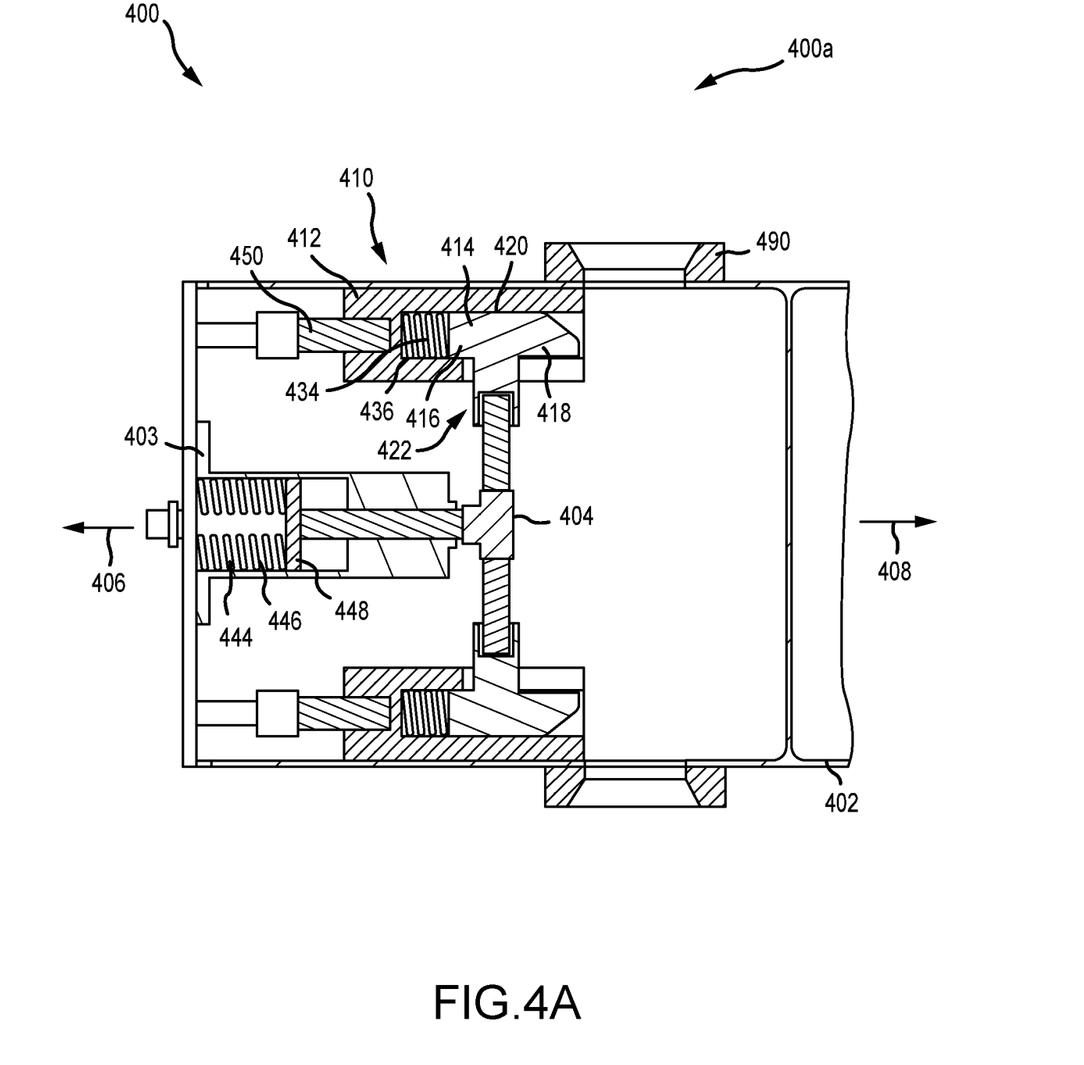
FIGS. 4A, 4B and 4C are side views of a thrust reverser door lock mechanism in, respectively, an unlocked state, a locked state and an overstow state.
Figure 4B:
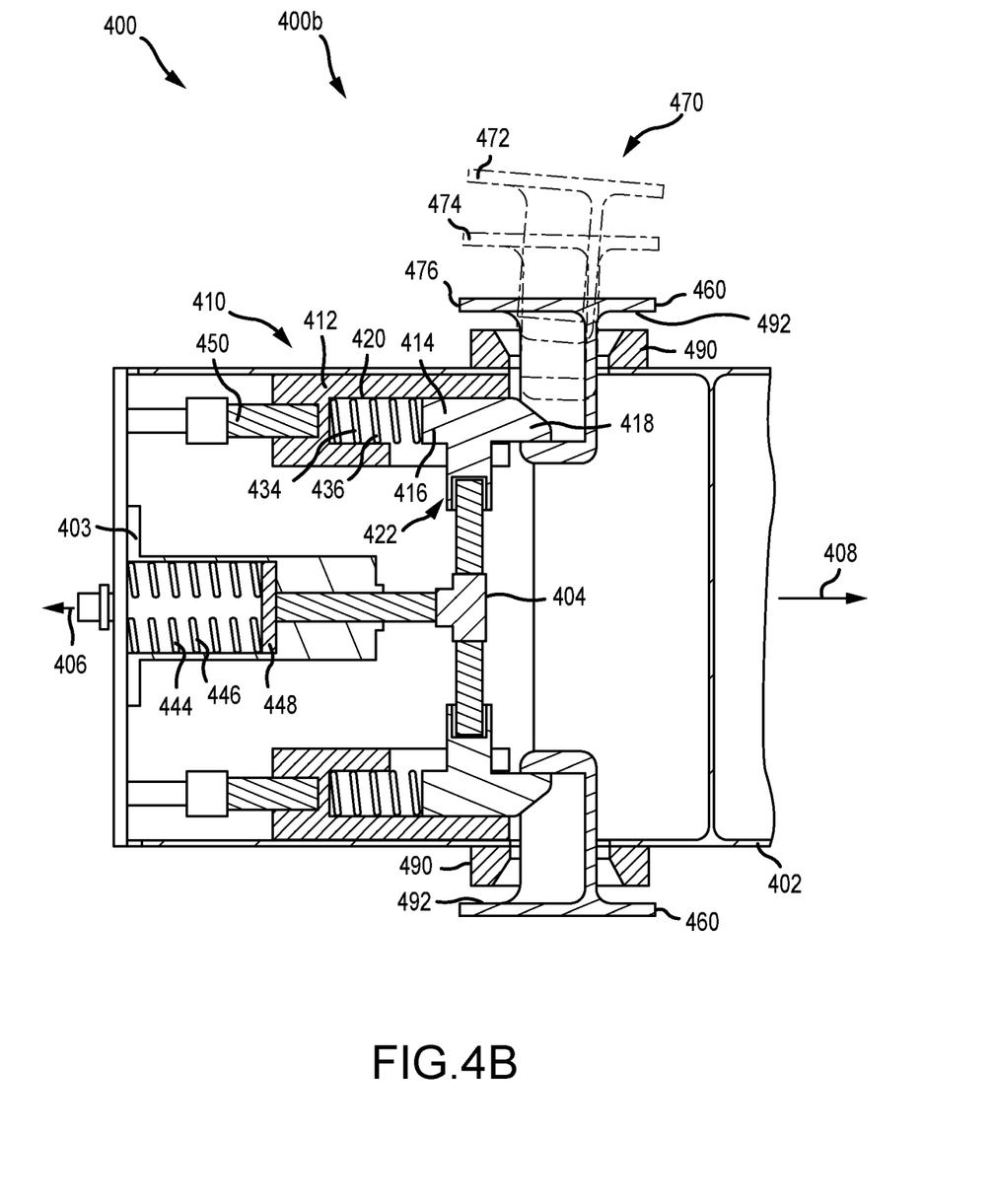
Figure 4C:
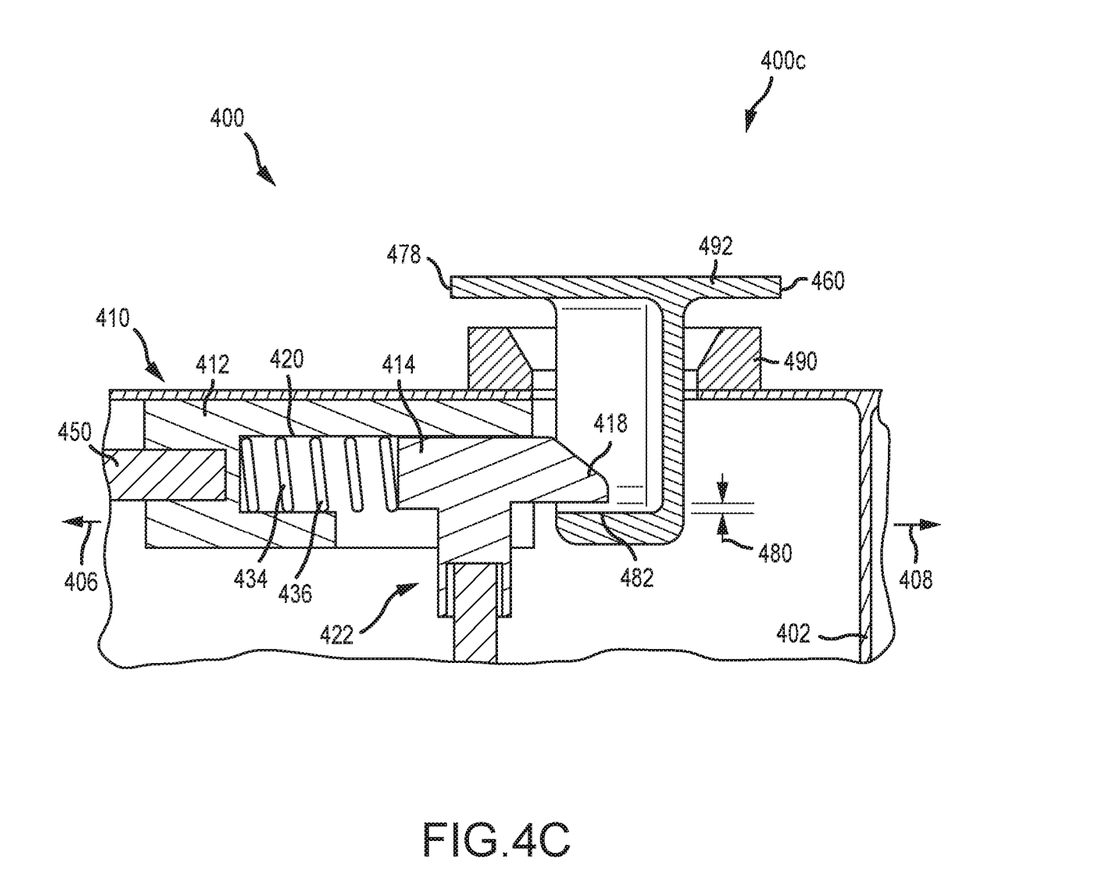

Referring now to FIGS. 4A, 4B and 4C, side views of a lock mechanism 400 in an unlocked state 400a, a locked state 400b and an overstow state 400c are illustrated, respectively, to describe the various components and operation thereof. Using like numerals to indicate like components, the lock mechanism 400 includes many of the components above described with similar operational features. In various embodiments, the lock mechanism 400 is illustrated mounted to a frame 402. In various embodiments, the frame 402 is connected to or made an integral part of a side beam, such as one of the opposing side beams 206 referred to in FIG. 2. The lock mechanism 400 may include an actuator 403 configured to selectively translate a tee-handle 404 in a fore direction 406 and an aft direction 408. In various embodiments, the fore direction 406 and the aft direction 408 are parallel to a central axis, such as the central axis A referred to in FIG. 2. The tee-handle 404 may be coupled to a pair of blade assemblies 410 configured to slidably engage lock fittings 460 (see FIG. 4C) extending from side portions of upper and lower reverser doors. In various embodiments, the blade assemblies 410 are urged in the aft direction 408 to engage the lock fittings 460 and in the fore direction 406 to disengage the lock fittings 460, as illustrated in FIGS. 4B and 4A, respectively.

In various embodiments, each blade assembly 410 includes a blade housing 412 and a blade member 414 slidably disposed within the blade housing 412 to translate in the fore direction 406 and the aft direction 408. In various embodiments, the blade member 414 includes a base portion 416 and a blade portion 418. The base portion 416 may be cylindrical in cross section and configured to slidably translate within a corresponding cylindrically shaped hollow portion 420 disposed within the blade housing 412. In various embodiments, each blade member 414 is coupled to the tee-handle 404 using a loose-joint coupling 422. In various embodiments, the loose-joint coupling 422 includes the same constructions, configurations, variations and features of the loose-joint 322 coupling described above with respect to FIG. 3 and, therefore, are not repeated.

As described above, a spring element 434 may be employed to urge the blade member 414 in the aft direction 408 as the actuator 403 disengages from or otherwise allows the tee-handle 404 to translate in the aft direction 408. When allowed to translate, the spring element 434 provides a load to translate the tee-handle 404 in the aft direction 408 via the load placed against the blade member 414. As described above, the spring element 434 may comprise passive or active elements or, in various embodiments, a coil spring 436 disposed within the cylindrically shaped hollow portion 420 of the blade housing 412. In various embodiments, a proximity sensor 450 is disposed proximate the blade member 414 to detect the position of the blade member 414—e.g., the translational position of the blade member 414 in both the fore direction 406 and the aft direction 408. The proximity sensor 450 may be configured to provide information to a controller whether the thrust reverser doors are locked to maintain a closed or stowed position or unlocked to maintain open or deployed position.

In various embodiments, the actuator 403 includes one or more actuator spring elements 444 that may also be employed to urge the blade member 414 in the aft direction 408 as the actuator 403 disengages from or otherwise allows the tee-handle 404 to translate in the aft direction 408. When allowed to translate, the actuator spring element 444 provides a load to translate the tee-handle 404 in the aft direction 408 via a load placed against a piston member 448 in the actuator 403. The actuator spring element 444 may comprise passive or active elements or, in various embodiments, a coil spring 446 disposed within the actuator 403. In various embodiments, the coil spring 446 has a first end disposed against the piston member 448 and a second end disposed against a base of the actuator 403 or frame 402. While spring elements are described in both the blade housing 412 and the actuator 403, it will be appreciated that either or both may be employed, according to various embodiments.

Referring now to FIG. 4B, a kinematic depiction 470 of a lock fitting 460 entering the lock mechanism 400 as an upper door of a thrust reverser closes or is stowed is illustrated. The kinematic depiction 470 illustrates a first state 472, a second state 474 and a final, locked state 476 of the lock fitting 460 with respect to the lock mechanism 400. As illustrated, the lock fitting 460 is urged downward into the lock mechanism 400, displaying a slight arc due to the upper door being connected to the thrust reverser by a pivot aft of the lock mechanism. While the lock fitting 460 is extending inward of the lock mechanism 400, the blade member 414 is translated in the fore direction 406 by the actuator 403 as described above. The lock fitting 460 will eventually reach an overstow position 478, as illustrated in FIG. 4C. The overstow position 478 provides a gap 480 between the blade portion 418 of the blade member 414 and an engagement surface 482 of the lock fitting 460. While the lock fitting 460 is in the overstow position 478, the actuator urges allows the tee-handle 404 to translate freely in the aft direction, which allows the spring element 434 to urge the blade portion 418 of the blade member 414 to translate into position adjacent the engagement surface 482 of the lock fitting 460. The lock fitting 460 then reverses direction a slight distance to assume the final, locked state 476 as illustrated in FIG. 4B. In various embodiments, a stop member 490 is sized and positioned to guide the lock fitting 460 into a proper location while the lock fitting 460 is traversing an arc during opening or closing of the thrust reverser doors. The stop member 490 may also be employed to reduce or minimize any misalignment of the lock fitting 460 due to defection of the thrust reverser doors during flight. The stop member 490 may also be employed to prevent the lock fitting 460 from over extending into the lock mechanism 400 by engaging an undersurface 492 of the lock fitting 460 at a predetermined extension of the lock fitting 460 into the lock mechanism 400.

When deploying the thrust reverser, the process described above is reversed. The lock fitting 460 is first urged into the overstow position 478, which removes any load between the blade portion 418 and the engagement surface 482 of the lock fitting 460. The actuator 403 then urges the tee-handle 404 in the fore direction 406, which in turn urges the blade portion 418 of the blade member 414 toward the fore direction 406 and away from the engagement surface 482 of the lock fitting 460. The lock fitting 460 then extends outward of the lock mechanism 400, following the reverse of the kinematic depiction 470 illustrated in FIG. 4B. In various embodiments, the actuator 403 will maintain the blade member 414 in the unlocked state until the reverser door is returned to a stowed state. The foregoing steps of locking and unlocking the lock mechanism 400 may be carried out under the control of an engine control unit, which may be configured to sequence various aircraft systems during a landing or during flight to ensure engagement of the blade portion 418 and the lock fitting 460 when required during flight and non-engagement during landing.

The above disclosure provides a robust and efficient load path between a lock fitting of a thrust reverser door and a blade member and its associated housing of a lock mechanism. The blade size and engagement length—e.g., the contact surface between the blade portion of a blade member and the engagement surface of a lock fitting—may be optimized for load, providing efficient and capable load paths within a small space envelope. The disclosure also allows decoupling of the loads between the blade member and its associated housing and the actuator through use of loose joints or fittings between the blade member and the actuator. The disclosure also provides a locking mechanism configured to disengage the blade members from the lock fittings with minimal overstow clearance, if required. In various embodiments, the disclosure set forth above and below is sequenced via an electronic engine controller to facilitate engagement of the blade members and the lock fittings under minimal load between the two.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lock mechanism for a pivot door of a thrust reverser, comprising:
   a frame portion of the thrust reverser, the frame portion defining a first direction and a second direction with respect to the thrust reverser;
   a blade housing connected to the frame portion;
   a blade member slidably disposed within the blade housing and configured to translate with respect to the first direction and the second direction, the blade member configured to engage a lock fitting of the pivot door;
   an actuator configured to translate the blade member in the first direction;
   a spring element configured to urge the blade member in the second direction; and
   a loose-joint coupling configured to connect the actuator to the blade member, the loose-joint coupling comprising a coupling member connected to the blade member and configured to translate together with the blade member in the first direction in response to the actuator,
   wherein the actuator includes a translating member configured to translate in the first direction and the second direction and an arm connecting the translating member to the blade member,
   wherein the loose-joint coupling is positioned between the arm and the blade member,
   wherein the blade member comprises a base portion and the blade housing comprises a hollow portion configured for translational movement of the base portion within the blade housing,
   wherein the spring element is a coil spring having a first end configured to abut the blade housing and a second end configured to abut the blade member.

2. The lock mechanism of claim 1, wherein the blade member comprises a blade portion configured to engage the lock fitting of the pivot door.

3. The lock mechanism of claim 1, further comprising a second coil spring having a first end configured to abut a base of the actuator and a second end configured to abut a piston disposed within the actuator and connected to the translating member.

4. The lock mechanism of claim 3, wherein the first direction is a fore direction with respect to the thrust reverser and the second direction is an aft direction with respect to the thrust reverser.

5. A lock mechanism for releasably securing a pivot door of a thrust reverser, comprising:
   a frame;
   a blade housing connected to the frame;
   a blade member slidably disposed within the blade housing and configured to engage a lock fitting of the pivot door;
   an actuator configured to translate the blade member in a first direction with respect to the frame;
   a spring element configured to translate the blade member in a second direction with respect to the frame, the second direction being opposite the first direction; and
   a loose-joint coupling configured to connect the actuator to the blade member, the loose-joint coupling comprising a coupling member connected to the blade member and configured to translate together with the blade member in the first direction in response to the actuator,
   wherein the actuator includes a translating member configured to translate in the first direction and the second direction and an arm connecting the translating member to the blade member,
   wherein the spring element is a coil spring having a first end configured to abut the blade housing and a second end configured to abut the blade member.

6. The lock mechanism of claim 5, wherein the blade member comprises a base portion and the blade housing comprises a hollow portion configured for translational movement of the base portion within the blade housing.

7. A pivot door thrust reverser having a lock mechanism for releasably securing an upper pivot door and a lower pivot door of the pivot door thrust reverser, comprising:
   a side beam, the side beam defining a fore direction and an aft direction with respect to the pivot door thrust reverser;
   a first blade housing connected to the side beam;
   a first blade member slidably disposed within the first blade housing and configured to translate with respect to the fore direction and the aft direction and to engage a lock fitting of the upper pivot door;
   a second blade housing connected to the side beam;
   a second blade member slidably disposed within the second blade housing and configured to translate with respect to the fore direction and the aft direction and to engage a lock fitting of the lower pivot door;
   an actuator configured to translate the first blade member in the fore direction and the second blade member in the fore direction;
   a first spring element configured to translate the first blade member in the aft direction;
   a second spring element configured to translate the second blade member in the aft direction; and
   a tee-handle connecting the actuator to the first blade member and to the second blade member, wherein the tee-handle is connected to the first blade member through a first loose-joint coupling and to the second blade member through a second loose-joint coupling, the first loose-joint coupling comprising a coupling member connected to the first blade member and configured to translate together with the first blade member in the fore direction in response to the actuator,
   wherein the first spring element is a first coil spring having a first end configured to abut the first blade housing and a second end configured to abut the first blade member and
   wherein the second spring element is a second coil spring having a first end configured to abut the second blade housing and a second end configured to abut the second blade member.

* * * * *